United States Patent [19]

Runggaldier et al.

[11] Patent Number: 5,239,252
[45] Date of Patent: Aug. 24, 1993

[54] METHOD AND APPARATUS FOR CONTROLLING SINGLE OR MULTIPHASE A.C. POWER CONTROLLERS

[75] Inventors: Diethard Runggaldier, Stegaurach; B. Claus Doerwald, Hoechstadt, both of Fed. Rep. of Germany

[73] Assignee: Siemens Aktiengesellschaft, Munich, Fed. Rep. of Germany

[21] Appl. No.: 475,173

[22] Filed: Feb. 5, 1990

[30] Foreign Application Priority Data

Feb. 7, 1989 [EP] European Pat. Off. ........ 891020661.1

[51] Int. Cl.⁵ .................................................. H02P 05/40
[52] U.S. Cl. ...................................... 318/806; 318/807
[58] Field of Search ........ 318/729, 739, 778, 798–803, 318/805, 806, 807, 811, 812

[56] References Cited

U.S. PATENT DOCUMENTS

| | | | |
|---|---|---|---|
| 4,355,274 | 10/1982 | Barbeau | 318/812 |
| 4,361,792 | 11/1982 | Davis, Jr. et al. | 318/729 |
| 4,469,998 | 9/1984 | Nola | 318/729 |
| 4,767,975 | 8/1988 | Vasworth | 318/729 |
| 4,950,970 | 8/1990 | Davis, Jr. et al. | 318/729 |

FOREIGN PATENT DOCUMENTS

| | | |
|---|---|---|
| 0113951 | 7/1984 | European Pat. Off. . |
| 2084359 | 6/1981 | United Kingdom . |
| 02404 | 6/1984 | United Kingdom . |

Primary Examiner—William M. Shoop, Jr.
Assistant Examiner—John W. Cabeca
Attorney, Agent, or Firm—Kenyon & Kenyon

[57] ABSTRACT

In the control of a.c. power controllers by the phase-angle control of semiconductor valves that are used to automatically control the power factor, it is necessary to determine the phase-angle between the current I and the voltage U by measuring the time difference between the current zero crossing and the voltage zero crossing. However, disturbances superimposed on the line voltage produce considerable statistical fluctuations, particularly in the measurement of the times for the voltage zero crossings. These fluctuations are propagated to the phase-angle and may lead to an unstable control response. Therefore, to determine the time difference, a reference time, which is calculated from the measured actual times of the preceding voltage zero crossings, is used for the voltage zero crossing.

21 Claims, 2 Drawing Sheets

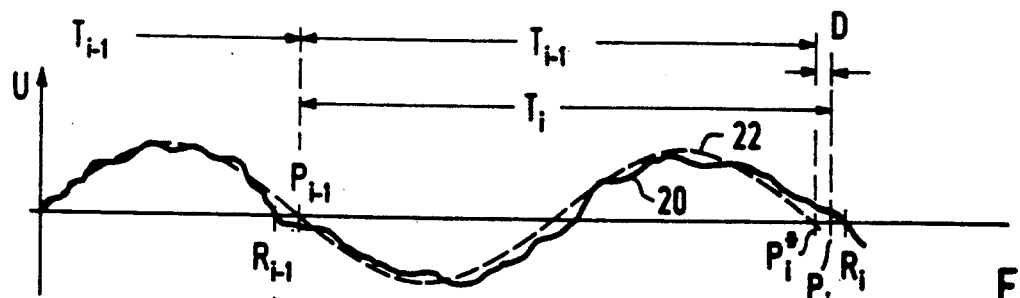
FIG 2
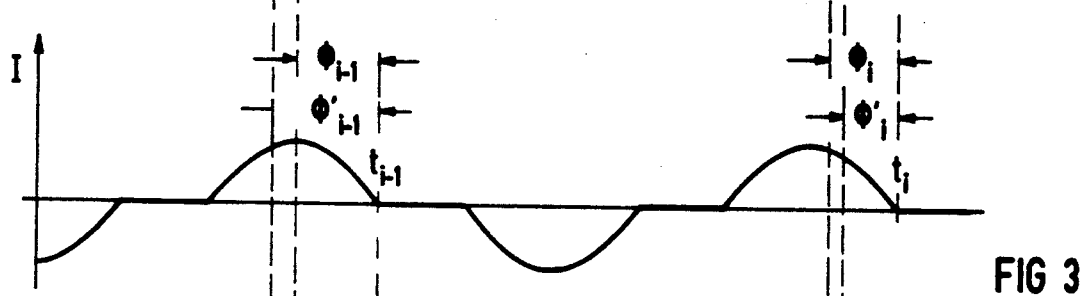
FIG 3
FIG 4
FIG 5
FIG 7

METHOD AND APPARATUS FOR CONTROLLING SINGLE OR MULTIPHASE A.C. POWER CONTROLLERS

BACKGROUND OF THE INVENTION

This invention relates to a method and apparatus for controlling power controllers in general and more particularly to a method and apparatus for controlling single or multiphase a.c. power controllers by using the phase-angle of semiconductor valves.

In order to automatically control the power supplied to an electrical load, e.g., a motor in an alternating current network, a.c. power controllers which are controlled by the phase-angle of semiconductor valves are used. The varying operating conditions that might occur require that the power supplied to the motor be automatically controlled in order to protect the network and the motor from unnecessary load transients. For example, such variations might result from the variable loading of the motor when it is being started or stopped. This is particularly true in the operation of an alternating-current motor. In order to automatically control the power supplied to the motor, it is necessary to determine the phase-angle between the voltage and the current.

A device for controlling an alternating current motor is disclosed in British Patent 2 084 359. The purpose of this device is to improve an unfavorable power factor, which may be caused, for example, by the underloading of the motor. For this purpose, controllable semiconductor devices, in particular a triac (a bidirectional triode thyristor) or an antiparallel thyristor circuit arrangement, are provided for each phase of the motor. By means of phase-angle control, these devices improve the power factor by using a method whereby the phase difference between the current and the voltage is detected in a control device for each phase. This phase difference is reduced by increasing the triggering angle, which is the time interval between the current zero crossing and the triggering point, for that particular phase.

This known device uses the time at which the current is zero as a reference time for determining the triggering point. The time of this current zero crossing is detected by measuring the voltage applied across the triac. This voltage is fed to a comparator, whose output states correspond to the states of this triac. The current zero crossing then corresponds to the waveform edge of the output signal of the comparator. From this comparator, with the aid of a monostable circuit, a series of pulses is produced for generating a ramp voltage which is synchronized with the voltage zero crossing of the supply voltage. The sampled value of the ramp voltage is subtracted from a reference voltage that is obtained externally via a potentiometer and transmitted to the inverting input of a differential amplifier. The output voltage of this differential amplifier is applied together with the ramp voltage to an additional comparator, which generates a primary triggering signal by means of a subsequent triggering pulse generator when the ramp voltage exceeds the output voltage of the differential amplifier. As a result of this circuit arrangement, the phase shift between the motor current and the motor voltage, and thus the power factor, is stabilized at a value which is given by the reference voltage adjusted by the potentiometer. Instead of determining the phase-angle by the analog method of using a ramp voltage synchronized with the system voltage, a digital measurement of the phase-angle that uses a counter is also known. The counter is started at the zero crossing of the voltage and stopped at the zero crossing of the current. The contents of the counter correspond to the phase-angle and can be used to control the power factor of the motor. The triggering angle is thereby varied until the actual phase-angle as measured equals the desired phase-angle (U.S. Pat. No. 4,361,792).

It has been shown that the measured phase-angle fluctuates from period to period due to disturbances which are superimposed on both the voltage and the current. These fluctuations of the measured phase-angle are then propagated, in the case of the known devices, to the triggering angle and lead to an unstable control response. In the automatic control of motors, for example, this results in the motor running in an irregular and unstable manner.

In view of the prior art, there is a need for a method and a device for controlling single or multiphase a.c. power controllers in which the fluctuations that occur from period to period in the measurement of the phase-angle do not lead to an unstable control response.

SUMMARY OF INVENTION

According to the present invention, this task is accomplished by determining the phase-angle $\phi_i$ from a reference time $P_i$ corresponding to the voltage zero crossing which is calculated from the measured times of the preceding actual voltage zero crossing. The essential concept underlying the invention is that the fluctuations of the voltage zero crossing are responsible for the fluctuations in the measurement of the phase-angle and for the resulting instability of the control response.

According to the present invention, in determining the phase-angle, not only the actual measured values for the voltage zero crossing and the current zero crossing are utilized, but a reference time based on the previously measured values for the voltage zero crossing is also used. Thus, this reference time does not equal the actual time of the voltage zero crossing and is independent of its statistical fluctuations.

By using the measured values for the preceding voltage zero crossing it is possible to calculate stable expected values for the subsequent voltage zero crossings which, depending on the underlying algorithm, are largely independent of short-term, statistical fluctuations in the actual voltage zero crossings. As a rule, these statistical fluctuations are caused by disturbances, which are superimposed on the system voltage. Thus, the present method corresponds to digital filtering.

To take into account long-term fluctuations of the line frequency, it is advantageous to determine the reference time from the preceding reference time by adding a calculated period of time to each cycle, which is calculated by adding a correction factor to the previously calculated period of time.

The sign of this correction factor equals the sign of the difference between the measured time of the voltage zero crossing and the reference time calculated for the preceding voltage zero crossing.

The correction factor may be a constant, or it may be a function of this calculated reference time. It is advantageous if the correction factor is much smaller than the calculated period of time in order to keep the fluctuations of the voltage zero crossing small from one cycle to another.

According to another aspect of the invention, it is advantageous to provide a microprocessor in order to make the algorithm used to calculate the phase-angle adaptable to different applications.

BRIEF DESCRIPTION OF THE DRAWINGS

FIGS. 2 to 5 show timing diagrams used to more fully explain the method of the present invention.

DETAILED DESCRIPTION

Figure 1:
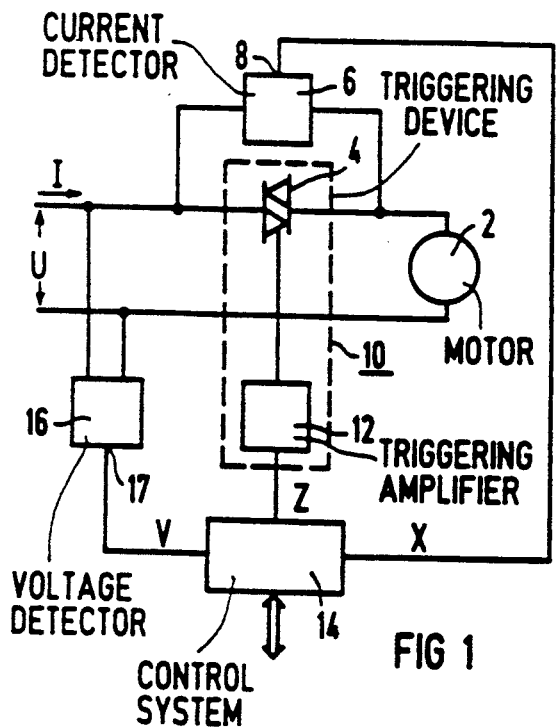
FIG. 1 is a block diagram illustrating apparatus for implementing the method according to the present invention.

FIG. 1 shows a load, specifically a motor 2 which is connected via a semiconductor valve 4, to a single-phase alternating-current system. The semiconductor valve 4 may comprise, for example, a triac or a circuit consisting of several semiconductor valves, such as a thyristor arrangement. The semiconductor valve 4 is provided with a control electrode and part of a triggering device 10, which contains the triggering amplifier 12 that is required by the semiconductor valve 4, and which may be, for example, an opto-electronic triggering amplifier or a triggering transformer. Instead of an electronically triggered semiconductor valve 4, an optically triggered semiconductor valve can be provided.

The semiconductor valve 4 is controlled by means of the phase-angle or triggering phase control. For this purpose, a triggering signal, which triggers the semiconductor valve 4, is applied to the control electrode as a function of the phase angle. In the illustrated embodiment of the invention seen in FIG. 1, a current detector 6 is assigned to the semiconductor valve 4. The current zero crossing of the current I flowing in the circuit is determined by this detector 6 from the voltage drop across the semiconductor device 4. The current zero crossing serves both to establish a reference time for the phase-angle control and also to determine the phase-angle. A corresponding current signal X is provided at the output 8 of the current detector 6. To accomplish this task, the current detector 6 may include a comparator, for example, which compares the absolute value of the voltage drop across the semiconductor device 4 with a defined threshold value.

A signal X which is always at one of two voltage levels is thus present at the output 8. One voltage level corresponds to one value of the current. This voltage level is less than a limiting value corresponding to the threshold value. By choosing this threshold value to be low, for example, about 10 V, this voltage level essentially corresponds to a current of zero and the current signal X essentially reproduces the circuit states of the semiconductor valve 4. The waveform edges between these two circuits states then both coincide roughly with the zero current crossing of the current I flowing through the semiconductor valve 4.

A voltage detector 16 is provided for measuring the voltage zero crossings. At its output 17, a binary voltage signal V is present, whose waveform edges coincide with the voltage zero crossings in analogy with the current signal X.

The output 8 of the current detector 6 and the output 17 of the voltage detector 16 are connected to a control system 14. This control system 14 derives a triggering signal Z from the current signal X and transmits it to the triggering amplifier 12. The triggering signal Z is time-delayed in accordance with a defined triggering angle.

From the voltage and current signals V and X, respectively, the control system 14 determines the phase-angle, which can then be adjusted, for example, by externally adjusting the triggering angle to a nominal value.

In accordance with FIG. 2, the system voltage U is plotted as a function of time. According to the Figure, disturbances are superimposed on the system voltage. These disturbances cause the actual curve 20 to deviate from the ideal curve 22 drawn with a dotted line in the Figure. The times at which the actual voltage is zero are designated in the Figure by $R_{i-1}$ and $R_i$.

The current I flowing across the semiconductor valve is similarly plotted in FIG. 3 as a function of time. The current I is zero at the time $t_{i-1}$ and becomes non-zero again at a triggering angle, which in the example of FIG. 3 occurs at about 60°.

According to FIG. 4, a current signal X has two voltage levels assigned to it. One voltage level corresponds to a non-zero current and the other voltage level corresponds to zero current. The times $t_{i-1}$ and $t_i$ at which the current I goes to zero are detected by the corresponding trailing edge 34.

Analogously, as seen in FIG. 5, the times at which the voltage U goes to zero are detected by a voltage signal V. According to FIG. 5, the voltage signal V also has two voltage levels, which are separated from each other by a waveform edge. According to the example of the Figure, the trailing waveform edges 44 correspond to the voltage zero crossings of the actual voltage U at the times $R_{i-1}$ and $R_i$, where the actual voltage changes sign from positive to negative.

A phase-angle $\phi'_{i-1}$ corresponds to the time between the zero crossing of the actual voltage at the time $R_{i-1}$ and to the zero crossing of the actual current at the time $t_{i-1}$. The time $R_{i-1}$ of this phase-angle $\phi'_{i-1}$ is measured with a counter that is triggered by the trailing waveform edge 44 of the voltage signal V. The contents of this counter are read at the time $t_{i-1}$, corresponding to the trailing edge 34 of the current signal X.

The next voltage zero crossing of the actual voltage occurs at the time $R_i$. Corresponding to this voltage zero crossing is the current zero crossing at the time $t_i$.

Because of the disturbances that are superimposed on the voltage in the example of FIG. 2, the voltage zero crossing at the time $R_{i-1}$ occurs earlier and the voltage zero crossing $R_i$ occurs later than the voltage zero crossing of the time-averaged voltage. The result of these fluctuations is that the phase-angles $\phi'_{i-1}$ and $\phi'_i$, which correspond to the actual zero crossing, can fluctuate considerably. Therefore, when determining the phase-angle, according to the invention, the times $P_{i-1}$ and $P_i$, which are calculated from the preceding voltage zero crossings are used as measuring points. These phase-angles are designated in FIG. 3 by $\phi_{i-1}$ or $\phi_i$. In the example of FIG. 2, the calculated voltage zero crossing at the time $P_{i-1}$ coincidentally equals the voltage zero crossing of the time-averaged voltage. Starting with the reference time $P_{i-1}$, a reference time $P_i$ is calculated for the next voltage zero crossing by adding to $P_{i-1}$ a calculated period $T_i$. This calculated period $T_i$ is greater than the preceding calculated period $T_{i-1}$ by the correction factor D when the actual voltage zero crossing occurs later than a provisional reference time $P_i^*$. The provisional reference time $P_i^*$ is calculated with the aid of the reference time $P_{i-1}$ and the calculated period $T_{i-1}$. Conversely, $T_i$ is determined by subtracting a correction factor D from the preceding calculated period $T_{i-1}$.

The absolute value of the correction factor D may, for example, also depend on the absolute value of the time difference $R_i$ and $P_i^*$. The correction factor D should be much smaller than the calculated period $T_i$. It should also be clearly smaller than the variations of the voltage zero crossings resulting from the voltage fluctuations. If these conditions are met, it can be concluded from FIG. 3 that the phase-angles $\phi_{i-1}$ and $\phi_i$, calculated with the aid of the references times $P_{i-1}$ and $P_i$, fluctuate perceptibly less than the actual phase-angles $\phi'_{i-1}$ and $\phi'$ corresponding to the actual voltage zero crossings.

The steps required to calculate the reference times $P_i$ and the phase-angle $\phi_i$ are preferably performed by the control system 14, which has the capability to carry out this task, such as with a microprocessor, for example.

Figure 6:
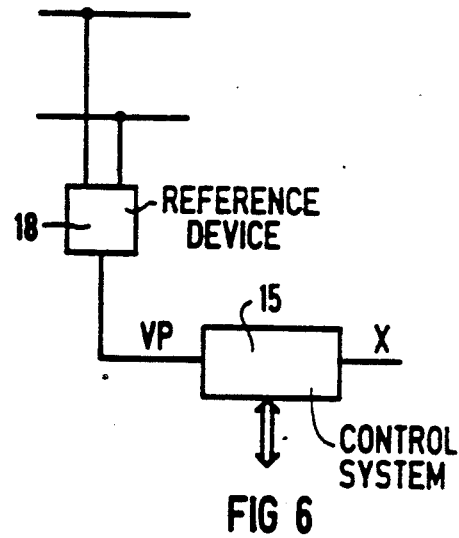
FIG. 6 depicts an advantageous refinement of the apparatus according to the present invention, which is more fully explained with the timing diagram shown in FIG. 7 is a timing diagram.

In a refinement of the invention according to FIG. 6, a reference device 18 is also provided. It detects the voltage zero crossings and maintains at its output a reference signal VP for the reference times $P_i$ seen in FIG. 7. The trailing waveform edges 54 of the reference signal VP coincide with the reference times $P_{i-1}$ and $P_i$. Then, instead of using the uncorrected voltage signal V, this reference signal VP can be fed to a known control system 15, when an appropriate and compatible signal arrangement is provided, for example. The necessary steps for calculating the reference times are thus already implemented in the reference device 18, which may contain a single-chip microprocessor, for example.

Figure 8:
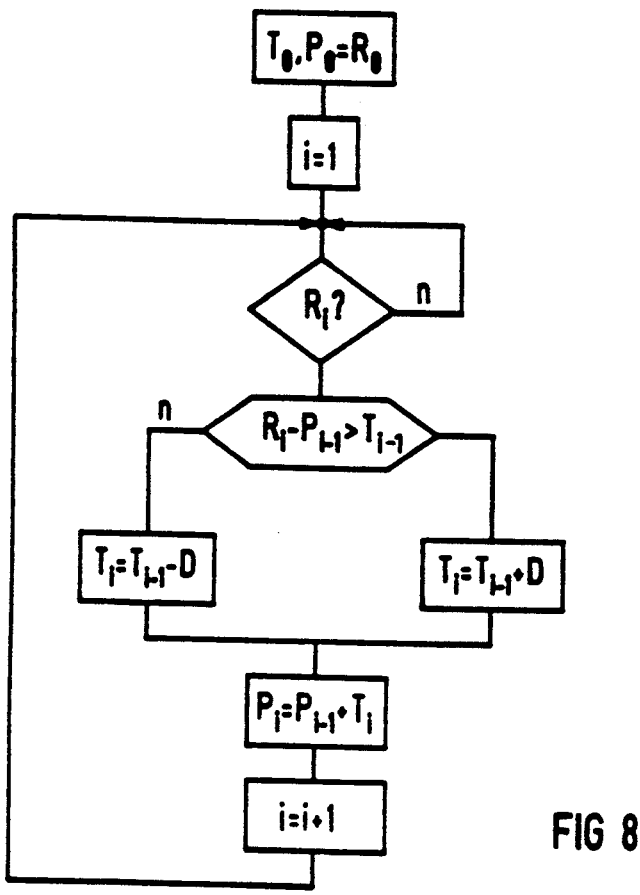
FIG. 8 is a flow diagram of an advantageous refinement of an algorithm used to calculate a reference time.

The appropriate process steps for determining the reference times $P_i$ are explained more fully based on the flow chart in FIG. 8. When the motor is started, the first zero crossing $R_0$ of the actual voltage is set as the first reference time $P_0$. The first calculated period $T_0$ can be given by the line-frequency, for example. When the actual voltage zero crossing $R_i$ occurs, a signal is produced. A comparison is then made in order to determine if the zero crossing $R_i$ of the actual voltage occurs earlier or later than the reference time $P_i^*$, which is provisionally calculated with the aid of the previously calculated reference time $P_{i-1}$ and the previously calculated period $T_{i-1}$. Depending on this result, the newly calculated period $T_i$ is determined either by the difference or the sum between the previously calculated period $T_{i-1}$ and the correction factor. The new reference time $P_i$ equals the sum of this calculated period $T_i$ and the reference time $P_{i-1}$. The reference time $P_i$ then serves as a measuring point for determining the phase-angle $\phi_i$.

In the control of multi-phase a.c. power controllers, it is advantageous to base the determination of the phase-angle $\phi_i$ on an average value calculated from the time for several current zero crossing occurring in the different phases. For example, in the case of a three-phase system, beginning with a time $t_{i,A}$ of the current zero crossing of the phase A, the time of the next current zero crossing, which occurs, for example, at the time $t_{i,C}$ in the phase C, can be measured, as can the time $t_{i,B}$ of the following current zero crossing, which occurs in the phase B. An average time $t_i = (t_{i,A} + t_{i,B} - 2T + t_{i,C} - T)/3$ can then be determined from these measured times $t_{i,A}$, $t_{i,B}$ and $t_{i,C}$, with the aid of the correction factor T, which corresponds to an angle of 60°, and this average time can be used as the basis for determining the phase-angle $\phi_i$. In a three-phase system Without a neutral conductor, one must also take into account that the determination of the voltage zero crossing is based on a voltage difference between two phases, for example A and B, so that the time $R_{i,AB}$ measured by this voltage difference must be corrected for the voltage zero crossing of the actual voltage by $\pm T/2$, depending on the direction of rotation, in order to obtain the time $R_i$ that is required for calculating the phase-angle $\phi_i$.

What is claimed is:

1. A method for automatically controlling the power factor at a load coupled to an a.c. network using single or multiphase a.c. power controllers, through the phase-angle control of semiconductor valves, comprising:
   a) measuring the times of actual voltage zero crossings at the load;
   b) measuring the times of current zero crossings at the load;
   c) calculating a reference time ($P_i$) for each voltage zero crossing from measured values for the times of preceding actual voltage zero crossings; and
   d) calculating a phase-angle ($\phi_i$) from said time difference occurring between the said reference time and a corresponding current zero crossing and using said phase-angle to generate control signals for semiconductor valves to thereby control the power factor.

2. The method according to claim 1, comprising calculating said reference time ($P_i$) by adding a calculated period ($T_i$) to the preceding reference time ($P_{i-1}$).

3. The method according to claim 2 wherein said calculated period ($T_i$) is determined by correcting the preceding calculated period ($T_{i-1}$) using a correction value (D), in which the sign of said correction value (D) conforms with the sign of the difference between the measured value for the time ($R_i$) of the true voltage zero crossing and the reference time ($P_{i-1}$) calculated for the preceding voltage zero crossing.

4. The method according to claim 3, wherein said correction value (D) is much smaller than the calculated period ($T_i$).

5. The method according to claim 4 wherein said network is a multiphase network and the calculation of the phase-angle ($\phi_i$) is based on an average value formed from the times for several current zero crossings taking place in different phases.

6. The method according to claim 3 wherein said network is a multiphase network and the calculation of the phase-angle ($\phi_i$) is based on an average value formed from the times for several current zero crossings taking place in different phases.

7. The method according to claim 2 wherein said network is a multiphase network and the calculation of the phase-angle ($\phi_i$) is based on an average value formed from the times for several current zero crossings taking place in different phases.

8. The method according to claim 1 wherein said network is a multiphase network and the calculation of the phase-angle ($\phi_i$) is based on an average value formed from the times for several current zero crossings taking place in different phases.

9. Apparatus for controlling the power factor at a load in an a.c. network with a single or multiphase a.c. power controller through the phase-angle control of semiconductor valves comprising:

a) a voltage zero-crossing detector providing an output indicative of the times of voltage zero crossings at the load;
b) a current zero-crossing detector providing an output indicative of the times of current zero crossings at the load; and
c) a control system having the outputs of said voltage and current zero crossing detectors as inputs, calculating a phase-angle ($\phi$) and providing as an output a firing signal (Z) for the semiconductor valves, said firing signal (Z) being time-delayed in accordance with the phase-angle ($\phi$), said control system calculating said phase-angle by:
  i) calculating a reference time ($P_i$) for each voltage zero crossing from measured values for the times of preceding true voltage zero crossings; and
  ii) calculating said phase-angle ($\phi_i$) from the time difference occurring between said reference time and a corresponding current zero crossing.

10. Apparatus according to claim 9, wherein said control system calculates said reference time ($P_i$) by adding a calculated period ($T_i$) to the preceding reference time ($P_{i-1}$).

11. Apparatus according to claim 10 wherein said control system determines said calculated period ($T_i$) by correcting the preceding calculated period ($T_{i-1}$) using a correction value (D), in which the sign of said correction value (D) conforms with the sign of the difference between the measured value for the time ($R_i$) of the actual voltage zero crossing and the reference time ($P_{i-1}$) calculated for the preceding voltage zero crossing.

12. Apparatus according to claim 11, wherein said correction value (D) is much smaller than the calculated period ($T_i$).

13. Apparatus according to claim 12 wherein said network is a multiphase network and the determination of the phase-angle ($\phi_i$) is based on an average value formed from the times for several current zero crossings taking place in different phases.

14. Apparatus for controlling single or multiphase a.c. power controllers through the phase-angle control of semiconductor values comprising:
a) a voltage zero-crossing detector providing an output indicative of the times of voltage zero crossings at the load;
b) a current zero-crossing detector providing an output indicative of the times of current zero crossings at the load; and
c) a reference device having the output of said voltage zero crossing detector as an input, forming a reference signal (VP) representing a reference time ($P_i$) from the preceding voltage zero crossings by; and
d) a control system having said reference time and the output of said current zero crossing detector as inputs calculating a phase-angle ($\phi$) equal to the difference between said reference time and the time of a corresponding current zero crossing and providing as an output a firing signal for the semiconductor valves said firing signal being time-delayed in accordance with said phase-angle.

15. Apparatus according to claim 14, comprising determining said reference time ($P_i$) by adding a calculated period ($T_i$) to the preceding reference time ($P_{i-1}$).

16. Apparatus according to claim 15, wherein said calculated period ($T_i$) is determined by correcting the preceding calculated period ($T_{i-1}$) using a correction value (D), in which the sign of said correction value (D) conforms with the sign of the difference between the measured value for the time ($R_i$) of the actual voltage zero crossing and the reference time ($P_{i-1}$) calculated for the preceding voltage zero crossing.

17. Apparatus according to claim 16, wherein said correction value (D) is much smaller than the calculated period ($T_i$).

18. In a control of single or multiphase a.c. power controllers through a phase-angle control of semiconductor valves where a phase angle is determined by measuring the time difference occurring between voltage zero crossing and a current zero crossings, a method comprising the steps of:
detecting the respective development of a network voltage with its true voltage zero crossings and the zero crossings of the current in the semiconductor valves; and
calculating a reference point for the voltage zero crossing from the measured values for the moments of preceding true voltage zero crossings by an addition of a calculated period to a preceding reference point.

19. The method of claim 18 wherein said calculated period is determined by correcting the preceding calculated period using a correction value, whereby the sign of this correction value conforms with the sign of the difference between the measured value for the true voltage zero crossing and the reference point calculated for the preceding voltage zero crossing.

20. The method of claim 19, wherein said correction value is much smaller than said calculated period.

21. The method of claim 18 wherein the determination of the phase angle is based on an average value formed from the moments for several current zero crossings taking place in different phases.

* * * * *